Patented May 1, 1923.

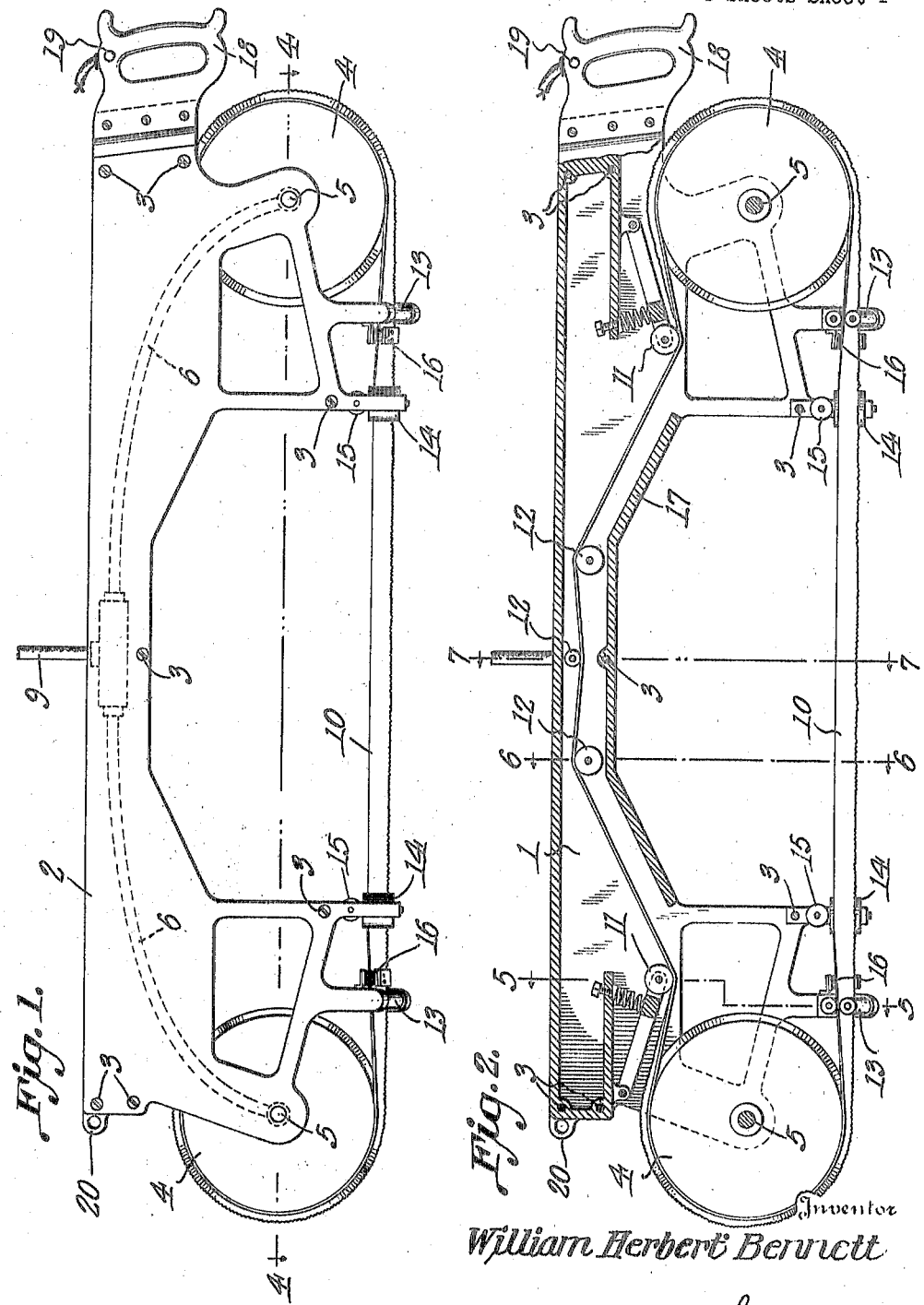

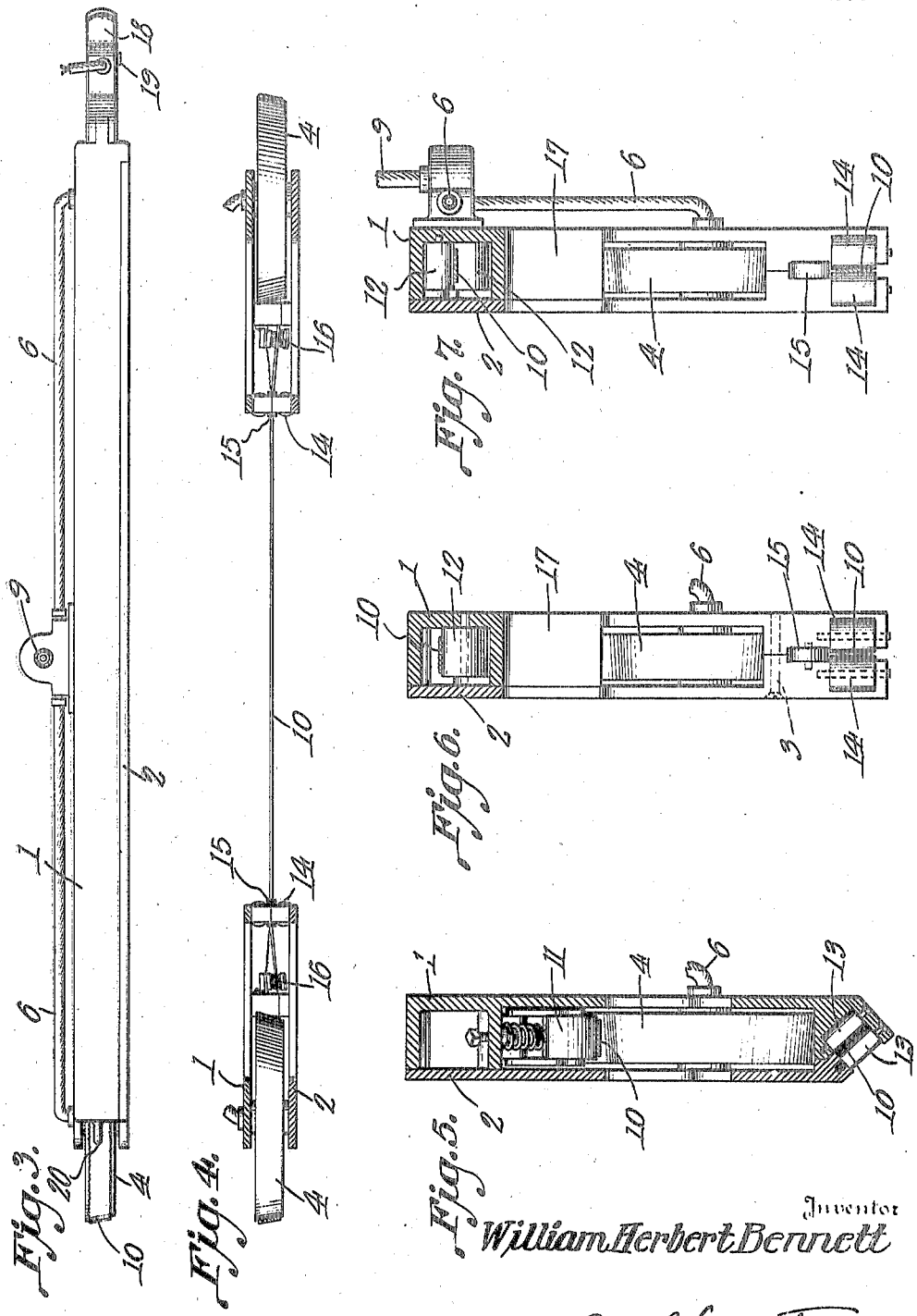

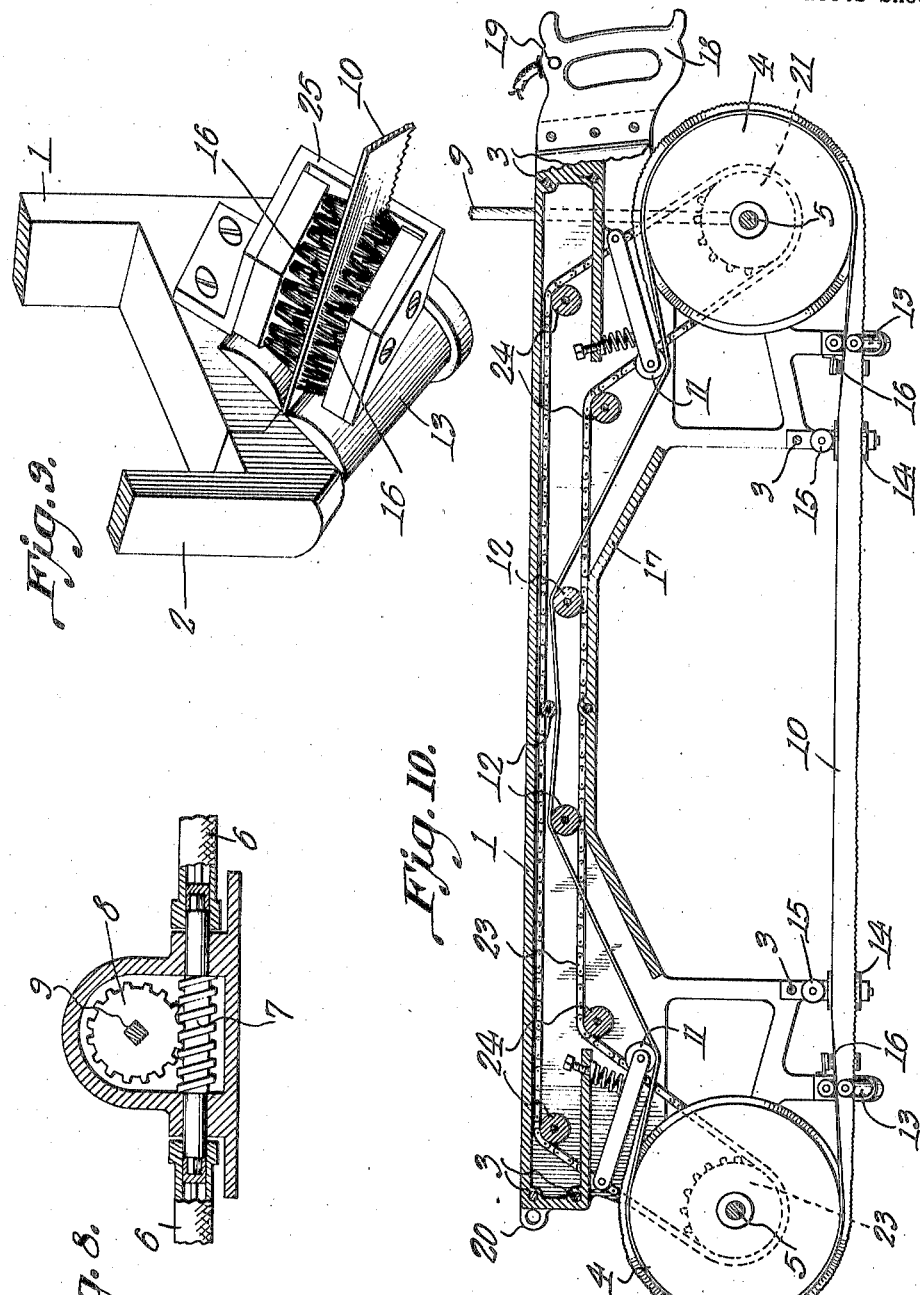

1,453,335

UNITED STATES PATENT OFFICE.

WILLIAM HERBERT BENNETT, OF CHARLOTTE, NORTH CAROLINA.

PORTABLE MOTOR-DRIVEN MEAT SAW.

Application filed February 25, 1922. Serial No. 539,249.

*To all whom it may concern:*

Be it known that I, WILLIAM HERBERT BENNETT, a citizen of the United States, residing at Charlotte, in the county of Mecklenburg and State of North Carolina, have invented a new and useful Portable Motor-Driven Meat Saw, of which the following is a specification.

The object of my invention is to provide an improved motor or power driven meat saw having novel means for guiding its band saw element, and having novel operating means, and novel means for adjusting the device and for permitting of changing of the band saw element when necessary. It is a further object of my invention to provide novel tensioning means for the band saw element; to provide novel brushes for cleaning the band saw; and to provide the novel combination and arrangement of parts hereinafter described and shown in the accompanying drawings, in which:—

Figure 1 is a side elevation of my invention;

Fig. 2 is a vertical longitudinal section of same;

Fig. 3 is a top plan view;

Fig. 4 is a horizontal longitudinal section on line 4—4 of Fig. 1;

Fig. 5 is a vertical cross section on line 5—5 of Fig. 2;

Fig. 6 is a vertical cross section on line 6—6 of Fig. 2;

Fig. 7 is a vertical cross section on line 7—7 of Fig. 2, partly in elevation;

Fig. 8 is a detail view partly in section and partly in elevation of the drive connection;

Fig. 9 is a detail perspective view of the brushes and diagonal rollers for guiding the band saw; and Fig. 10 is a vertical longitudinal section of a form of my invention utilizing a chain drive.

Like numerals designate like parts in each of the several views.

Referring to the accompanying drawings I provide a suitable saw frame 1, to which main casting is removably mounted the cover plate 2 by suitable means such as screws 3. Mounted at opposite ends of the main frame I provide relatively large pulleys 4 on which a suitable band saw 10 is mounted. The shafts or axles 5 of pulleys 4 are driven from some suitable common source of power such as the flexible shafts 6 shown in Fig. 1 which are attached to the worm 7, that member being actuated by worm gear 8 attached to the flexible drive shaft 9.

In order to obtain the most efficient operative connection between the band saw 10 and the pulleys 4 I provide a suitable tension device at each end of the frame such as the adjustable and resilient tension device 11 shown in Fig. 2. I further provide suitable guide rollers 12 for guiding the band saw through the frame 1 as shown in Figs. 2 and 10.

For the purpose of causing the band saw to travel in a vertical or aligned position relative to the same when in use, I provide improved band saw guiding means consisting of a set of diagonal rollers in proximity to each pulley and between which rollers the band saw travels, as shown in Figs. 2, 4 and 10, and a plurality of vertical rollers 14 spaced from the diagonal rollers, as shown in the same views and in Fig. 1. I further provide horizontal guide rollers 15 mounted above rollers 14 to insure the proper horizontal alignment of the band saw elements. I provide suitable brushes 16 mounted in a suitable bracket 25, such as shown in Fig. 9 for cleaning the band saw.

The frame 1 is provided with a guard portion 17 to permit of taking hold of the frame without danger of cutting the hand on the band saw. I also provide a handle 18 having a suitable electric switch 19 for manually controlling power for driving the band saw. I also provide a suitable eye or hook 20 at the end of the frame opposite the handle for hanging the saw up when not in use.

I may utilize a chain guide, such as shown in Fig. 10 consisting of the drive sprocket 21 and the driven sprocket 22 from the respective pulley shafts 5, as shown, these sprockets being operatively connected by a sprocket chain 23 which is guided over suitable idlers 24, as shown in the drawings. The flexible drive shaft 9 is directly connected with one of the pulley shafts 5.

The manner of using the saw will be obvious from the drawings and as the frame will be made of light material such as aluminum it may be held simply by the handle 18, or the guard portion 17 of the frame may be grasped in the other hand. The power is turned on and off by the switch 19 on the handle 18. The resilient tension devices 11 insure frictional engagement of the band saw on the pulleys and efficient driving of the band saw. The two sets of guide rollers, one diagonal and one vertical, at each end of the frame in proximity to each of the respective pulleys efficiently tilt from horizontal to vertical position for sawing without danger of unseating the band saw from the pulleys, and correct alignment of the operative portion of the saw is maintained by the horizontal pulleys 15.

While the form of the invention herein disclosed is my preferred embodiment of the invention, I may make minor changes in the details of the device without departing from the essential elements hereinafter claimed.

What I claim is:

1. In a power driven portable hand saw, the combination of a frame, pulleys mounted at opposite ends of the frame, a saw band passing around the pulleys, and a plurality of guiding rollers near each end of the frame to guide the band saw into a plane with that of the pulleys, the guide rollers nearest the pulleys being disposed at an angle diagonal to the frame and the guide rollers nearer the center of the frame being disposed in alignment therewith.

2. In a power driven portable meat saw, the combination of a frame having a handle, pulleys mounted at opposite ends of the frame, flexible shafts operatively connected with the hubs of each of said pulleys, a common drive shaft with which said first mentioned flexible shafts are operatively connected, a band saw mounted on the pulleys, and an electric switch positioned in the handle of the frame for manually controlling the operation of the pulleys.

3. In a power driven portable meat saw, the combination of a frame having a handle, pulleys mounted at opposite ends of the frame, means for driving the pulleys from a common source of power, an electric switch positioned in the handle of the frame for manually controlling the operation of the said driving means, and a band saw mounted on the pulleys.

4. In a power driven portable meat saw, the combination of a frame, pulleys mounted at opposite ends of the frame, a saw band passing around the pulleys, and resiliently actuated tension devices positioned in proximity to the pulleys and resiliently exerting tension on the saw band to hold it in frictional engagement on the pulleys.

5. In a portable power driven meat saw, the combination of a hollow elongated frame, pulleys mounted at opposite ends of said frame, means for simultaneously guiding the saw band element at each end of the frame from a plane transversely of that of the pulleys to a plane aligned with them, said means consisting of a set of diagonally positioned guide rollers, a set of guide rollers disposed in alignment with the pulleys, and a transversely disposed roller positioned above the rollers aligned with the pulleys, whereby to positively guide the saw band to the desired position and preventing its leaving the pulleys.

6. In a portable power driven meat saw, the combination of a frame, pulleys mounted at opposite ends of said frame, means for simultaneously driving the pulleys from a common source of power, a plurality of guide rollers at each end of the frame for guiding the saw band into a plane in alignment with the pulleys, said rollers including a set of diagonally disposed guide rollers and a set of rollers disposed in alignment with the frame and pulleys and spaced inwardly from the diagonal rollers.

7. In a portable power driven meat saw, the combination of a hollow frame having a handle at one end thereof and having an eye member at the other end thereof, spaced pulleys mounted in the frame, a removable cover plate for permitting access to the band saw and to tension devices, resiliently actuated tension devices mounted within the frame and positioned adjacent the pulleys for holding the band saw in frictional engagement therewith.

8. In a portable motor driven meat saw, the combination of an elongated hollow frame, adapted to contain a band saw and tension devices, a removable cover plate for said frame, spaced pulleys mounted on the frame, means operatively connected with the respective pulleys for driving same from a common source of power, said means including a flexible main drive shaft, an endless saw band mounted on the pulleys, tension devices mounted within the frame and positioned in proximity to the pulleys and resiliently pressed against the saw band, and band saw guiding means.

WILLIAM HERBERT BENNETT.